United States Patent Office 3,520,947
Patented July 21, 1970

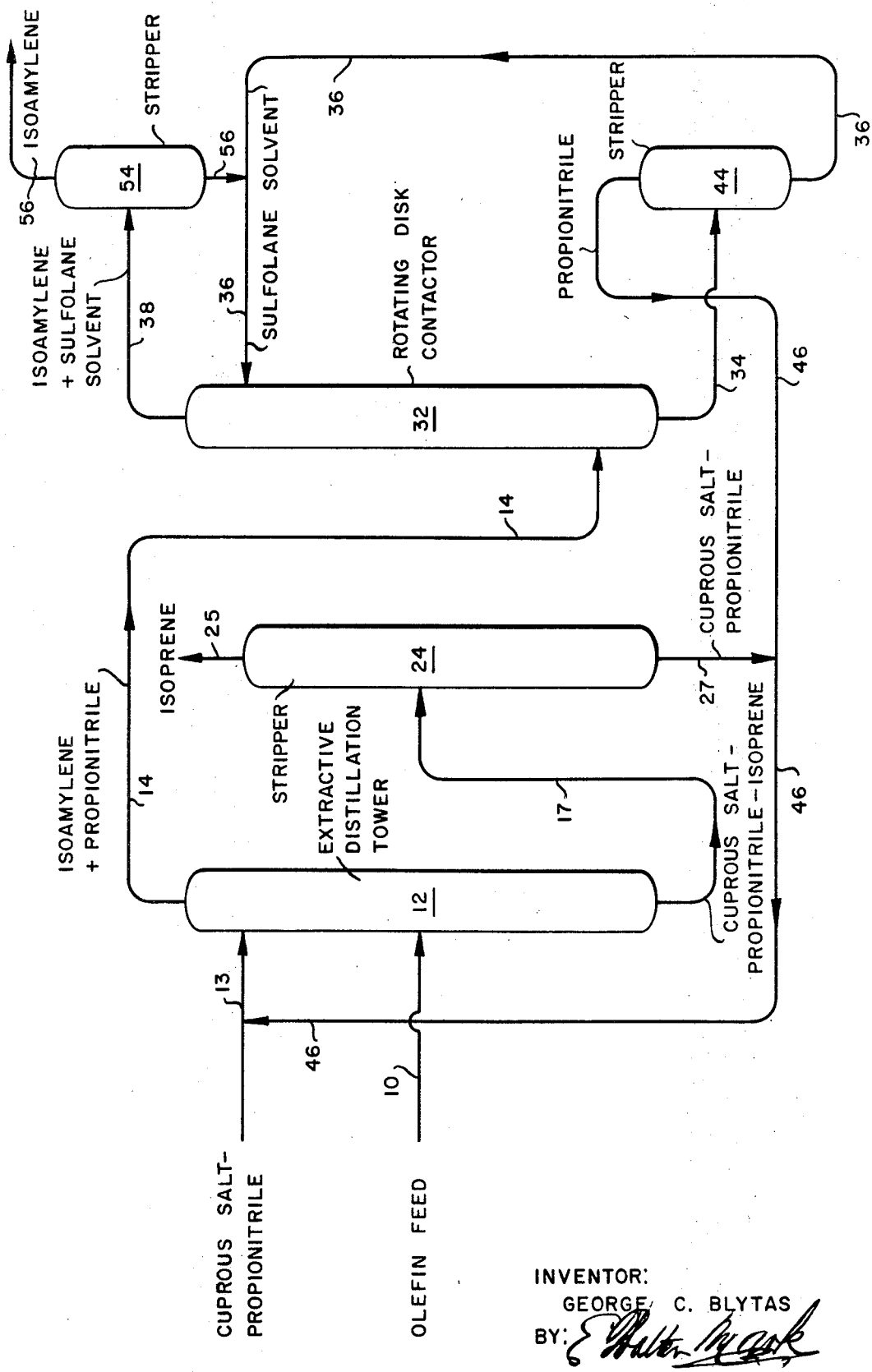

3,520,947
OLEFIN SEPARATION
George C. Blytas, Kensington, Calif., assignor to Shell Oil Company, New York, N.Y., a corporation of Delaware
Filed Aug. 19, 1968, Ser. No. 753,482
Int. Cl. B01d 3/40; C07c 7/00, 11/00
U.S. Cl. 260—681.5
4 Claims

ABSTRACT OF THE DISCLOSURE

A process of separating isoprene from isoamylenes by selectively contacting a mixture of isoprene and isoamylenes with a cuprous salt in propionitrile to separate an isoprene-containing propionitrile phase and an isoamylene-containing propionitrile phase and subsequently separating the isoamylenes from the isoamylene-containing propionitrile phase by extraction with a sulfolane solvent.

BACKGROUND OF THE INVENTION

The extractive distillation of a low boiling olefin from a hydrocarbon mixture containing that olefin and close boiling, more saturated hydrocarbons of the same carbon number with a solution of a cuprous salt is known in the art. One useful method is that of Dunlop et al., U.S. Ser. No. 530,476, filed Feb. 28, 1966, now U.S. 3,401,112, issued Sept. 10, 1968, wherein a solution of a cuprous salt in propionitrile is employed as the extractive distillation medium. Although such cuprous salt-propionitrile solutions are generally suitable for the separation of most mixtures, certain hydrocarbons, whose volatilities are close to that of propionitrile, cannot be readily separated from the propionitrile solvent with ordinary distillation. For example, although cuprous salt-propionitrile solutions readily effect the separation of isoprene from isoamylenes, the subsequent separation of the isoamylene from the resulting raffinate phase containing propionitrile and isoamylene is extremely difficult by ordinary distillation because of the close volatilities of propionitrile and isoamylenes. It would be of advantage, however, to conduct the separation of isoprene from isoamylenes with cuprous salt-propionitrile solutions and subsequently effectively separate the isoamylene from the propionitrile solvent.

SUMMARY OF THE INVENTION

It has now been found that separation of isoprene from a $C_5$ hydrocarbon mixture containing isoprene, isoamylenes, and other closely boiling monoolefinic and saturated $C_5$ hydrocarbons is effected by an improved process which comprises: (1) extractively distilling the $C_5$ hydrocarbon mixture with a solution of a cuprous salt in propionitrile and separating a substantially isoprene-free raffinate phase comprising $C_5$ hydrocarbons and propionitrile and an extract phase comprising isoprene, cuprous salt and propionitrile, and (2) contacting the isoprene-free raffinate phase with a sulfolane solvent and separating a second raffinate comprising $C_5$ hydrocarbons and sulfolane solvent and a second extract phase comprising propionitrile and sulfolane solvent. The process of the invention is characterized by improved separation of isoamylenes as well as efficient recovery of the propionitrile solvent.

BRIEF DESCRIPTION OF THE DRAWING

An application of the separation process is shown in the accompanying drawing, which is a flow diagram of the process. A stream 10 of a mixture of isoprene and isoamylenes is introduced as a vapor or as a liquid at just below its boiling point into an intermediate zone of a conventional extractive distillation column 12. A selective solvent mixture, such as 25:75 by weight of cuprous sulfate in propionitrile, enters the column adjacent its top through line 13, at approximately 30–50° C. The column is maintained at a pressure of 15–35 p.s.i.a. and at top and bottom temperatures of approximately 50–80° C. and 20–50° C., respectively. The feed stream is volatilized, and passes in the vapor state countercurrent to the descending solvent mixture stream which selectively extracts the isoprene. This extract is removed from the base of the column 12 through line 17 and is passed into a solvent stripper 24. The solvent stripper 24 operates at a pressure of about 15–25 p.s.i.a., and at a temperature of approximately 80–120° C. Here, the isoprene leaves the solvent in an overhead vapor, and is recovered as product via line 25. The isoprene-free cuprous salt-propionitrile solution is drawn off the bottom of stripper 24 through line 27 and is recycled via line 46 to the extractive distillation column 12.

The raffinate vapor of isoamylenes and propionitrile leaves the top of column 12 via line 14 and passes as a vapor or as a liquid into a suitable contacting vessel, such as a rotating disc contactor 32. A stream of sulfolane solvent enters the top of the contactor 32 through line 36. The isoamylene and propionitrile pass countercurrent to the descending sulfolane solvent stream which selectively extracts the propionitrile. The contactor 32 is suitably maintained at a temperature of about 20–50° C. and at hydrostatic pressure. The sulfolane-propionitrile extract is removed from the base of the contactor 32 through line 36 and is passed into a solvent stripper 44. The solvent stripper 44 operates at a pressure of about 1 to 10 p.s.i.a., and at a reboiler temperature of approximately 175 to 250° C. In the solvent stripper 44, the propionitrile leaves the sulfolane solvent in an overhead vapor and is condensed and recycled via line 46 to the extractive distillation column 12. The essentially propionitrile-free sulfolane solvent is drawn off the bottom of stripper 44 and is recycled via line 36 to the rotating disc contactor 32.

The raffinate phase of isoamylenes and sulfolane solvent leaves the top of the rotating disc contactor 32 and passes via line 38 into solvent stripper 54. The solvent stripper 54 operates at a pressure of about 1 to 10 p.s.i.a., and at a reboiler temperature of approximately 200 to 230° C. In the solvent stripper 54, the isoamylenes are separated from the sulfolane solvent in an overhead vapor, and are condensed and recovered via line 56. The essentially isoamylene-free sulfolane solvent is drawn off the bottom of stripper 54 through line 56 and is recycled via line 36 to the rotating disc contactor 32.

The raffinate phase of isoamylenes and sulfolane solvent leaves the top of the rotating disc contactor 32 and passes via line 38 into solvent stripper 54. The solvent stripper 54 operates at a pressure of about 1 to 10 p.s.i.a., and at a reboiler temperature of approximately 200 to 230° C. In the solvent stripper 54, the isoamylenes are separated from the sulfolane solvent in an overhead vapor, and are condensed and recovered via line 56. The essentially isoamylene-free sulfolane solvent is drawn off the bottom of stripper 54 through line 56 and is recycled via line 36 to the rotating disc contactor 32.

For simplicity, the drawing does not show all the pumps, tanks, heat exchangers, valves, by-passes, vents, reboilers, condensers, coolers, and other auxiliary equipment that may be necessary for the proper operation of the process but the inclusion of which will be evident to those skilled in the art.

DESCRIPTION OF THE PREFERRED EMBODIMENTS

The process of the invention comprises the separation of isoprene from a mixture containing isoamylene and other close boiling monoolefinic or saturated $C_5$ hydrocarbons with cuprous salt-propionitrile solutions and the subsequent separation of isoamylene along with the other C₅ hydrocarbons from the resulting isoprene-free raffinate phase by extraction with a partially miscible sulfolane solvent.

The separation process is generally applicable to the separation of isoprene from any hydrocarbon feed mixture containing isoprene, isoamylenes and other close boiling monoolefinic and saturated $C_5$ hydrocarbons. A suitable hydrocarbon feed mixture, available from catalytically cracked petroleum fractions, comprises 33% weight isoprene, 66% weight isoamylenes (38% weight 2-methylbutene-2, 18% weight 2-methylbutene-1), 3% weight isopentane, 5% weight pentane and 3% weight of a mixture of hydrocarbons boiling in the $C_5$ range such as 3-methylbutene-1, piperylene, cyclopentadiene, and di-methylacetylene. It is generally preferred that the hydrocarbon feed mixture contain at least 25% weight isoprene and at least 25% weight isoamylenes, i.e., 2-methylbutene-2, 2-methylbutene-1 and 3-methylbutene-1.

The cuprous salt-propionitrile solutions are prepared by more or less conventional methods. In one modification, the cuprous salt-propionitrile solution is prepared by simply dissolving a cuprous salt of reasonable purity in propionitrile. Alternatively, cuprous salt-propionitrile solutions are conveniently prepared by contacting substantially stoichiometric amounts of a cupric salt and metallic copper in propionitrile at elevated temperatures. Exemplary cuprous salt-propionitrile solutions include propionitrile solutions of cuprous sulfate, cuprous trifluoroacetate, cuprous halides, e.g., cuprous chloride and cuprous bromide, cuprous tetrachloroaluminate, cuprous acetate, cuprous benzenesulfonate, cuprous ethylsulfonate, cuprous difluorophosphate, and cuprous perfluoroborate, cuprous hexafluorophosphate. The solutions of cuprous salt in propionitrile employed in the process of the invention contain from about 10% by weight to about 60% by weight of cuprous copper. Cuprous sulfate, cuprous trifluoroacetate, cuprous chloride, cuprous bromide, and cuprous chloroaluminate are preferred cuprous salts for preparation of cuprous-propionitrile solutions employed in the separation process.

Any suitable method of contacting the hydrocarbon mixture and the cuprous salt-propionitrile solution can be employed. A preferred procedure is to countercurrently contact the hydrocarbon mixture with the cuprous salt-propionitrile solution under extractive distillation conditions as shown and with reference to the drawing described. The temperature employed in the extractive distillation varies from about 40° C. to about 100° C. and the pressure employed varies from about 10 p.s.i.a. to about 100 p.s.i.a. Useful hydrocarbon feed mixture to cuprous salt-propionitrile volume ratios range from about 0.75:1 to about 20:1. In general, the cuprous salt to propionitrile weight ratio varies from about 1:1 to about 1:5. It is generally preferred to effect the contacting of the cuprous copper solution and hydrocarbon feed in an inert, i.e., oxygen-free and substantially anhydrous environment.

The extractive distillation of the hydrocarbon feed mixture produces an extract phase containing the isoprene and a raffinate phase containing the isoamylene and other $C_5$ hydrocarbons present in the feed and propionitrile solvent. The raffinate phase is separately contacted with a sulfolane solvent to separate the hydrocarbons, e.g., isoamylene, from the propionitrile solvent.

The sulfolane solvents suitably employed are sulfolane compounds of up to 6 carbon atoms and of up to two alkyl substituents, e.g., methyl or ethyl. Illustrative sulfolane solvents therefore include sulfolane (tetramethylenesulfone), 2-methylsulfolane, 3-methylsulfolane, 2,3-dimethylsulfolane, 3,5-dimethylsulfolane, 2-ethylsulfolane and 3-ethylsulfolane. The preferred sulfolane solvent is sulfolane.

Any suitable method of contacting the sulfolane solvent with the raffinate phase containing $C_5$ hydrocarbons (isoprene-free) and propionitrile can be employed. A preferred procedure is to countercurrently contact the raffinate phase with a sulfolane solvent in a rotating disc contactor of the type disclosed by U.S. 2,601,674 of Reman, issued June 24, 1952.

The contacting of the raffinate and sulfolane solvent can be conducted at any convenient temperature. In general, temperatures of from about 20° C. to 80° C. are satisfactory. Suitable pressures vary from 15 p.s.i.a. to about 200 p.s.i.a. although substantially hydrostatic pressures are preferred. The amount of sulfolane solvent employed is not critical provided that the amount is at least sufficient to dissolve the propionitrile to be extracted. Useful sulfolane solvent to raffinate feed ratios range from about 0.5:1 to about 20:1 by volume and preferably from about 1:1 to about 5:1 by volume.

To further illustrate the process of the invention the following examples are provided. It should be understood that the details thereof are not to be regarded as limitations, as they may be varied as will be understood by one skilled in this art.

EXAMPLE I

A mixture of 1 mole 2-methylbutene-2 and 2 moles of propionitrile is equilibrated with 4 mole of sulfolane in a pressure glass vessel at a temperature of 25° C. The mixture separates into a heavy polar, sulfolane phase containing most of the propionitrile, and a light, non-polar 2-methylbutene-2 phase containing a small amount of propionitrile. The K-value for 2-methylbutene-2 and propionitrile in sulfolane, defined below in Equation I, is found to about 4.2.

$$K_{25°} = \frac{\text{percent mole propionitrile in sulfolane}}{\text{percent mole propionitrile in 2-methylbutene-2}}$$

(I)

EXAMPLE II

A hydrocarbon feed composed of 35% weight isoprene and 65% weight 2-methylbutene-2 is injected continuously into an extractive distillation column countercurrent to a solvent mixture containing about 35% by weight cuprous trifluoroacetate in propionitrile, under the following operating conditions:

Average column temperature—58° C.
Average condenser temperature—32° C.
Solvent/feed ratio—11
Average column pressure—20–25 p.s.i.a.
Reflux ratio—2.2

The extract from the extractive distillation is passed to a first solvent stripper operated under the following conditions:

Stripping column temperature—105–110° C.
Stripping column operating pressure—18–23 p.s.i.a.

Isoprene is recovered from the solvent stripper at a yield of 95% of the original isoprene in the feed and in a purity of more than 99%.

The raffinate of propionitrile and 2-methylbutene-2 from the extractive distillation is taken overhead and is passed in the liquid phase into a rotating disc contactor countercurrent to a descending stream of sulfolane, under the following operating conditions:

Average column temperature—~30° C.
Sulfolane/raffinate feed molar ratio—4
Average column pressure—Hydrostatic The extract phase of propionitrile and sulfolane from the rotating disc contactor is passed to a second solvent stripper operated under the following conditions:

Stripping column temperature—210° C.
Stripping column operating pressure—2–3 p.s.i.a.

Propionitrile is recovered from the solvent in a purity of more than 90% and is recycled to the extractive distillation column for further use.

The raffinate phase of 2-methylbutene-2 and sulfolane from the rotating disc contactor is passed to a third solvent stripper operated under the following conditions:

Stripping column temperature—210° C.
Stripping column operating pressure—4–5 p.s.i.a.

2-methylbutene-2 is recovered from the solvent stripper at a yield of 95% of the original 2-methylbutene-2 in the feed and in a purity of more than 99%.

I claim as my invention:

1. A process for the separation of isoprene from a hydrocarbon mixture containing isoprene, isoamylenes and other closely boiling monoolefinic and saturated $C_5$ hydrocarbons comprising:
    (1) extractively distilling the hydrocarbon mixture with a solution of a cuprous salt in propionitrile as selective solvent to produce a first raffinate phase comprising isoamylenes and propionitrile and a first extract phase comprising isoprene, cuprous salt and propionitrile,
    (2) separately intimately contacting the first raffinate phase with a partially miscible sulfolane solvent to produce a second raffinate phase comprising isoamylenes and sulfolane and a second extract phase comprising propionitrile and sulfolane solvent, and
    (3) separately recovering the propionitrile from the second extract and returning it to the extractive distillation step (1).

2. The process of claim 1 wherein the sulfolane solvent has up to 6 carbon atoms and up to 2 alkyl substituents.

3. The process of claim 2 wherein the cuprous salt is cuprous sulfate or cuprous trifluoroacetate.

4. The process of claim 3 wherein the sulfolane solvent is sulfolane.

References Cited
UNITED STATES PATENTS 3,401,112  9/1968  Dunlop et al. _____ 260—681.5

DELBERT E. GANTZ, Primary Examiner

G. E. SCHMITKONS, Assistant Examiner

U.S. Cl. X.R.

203—51, 57; 260—677